United States Patent [19]

Garrett et al.

[11] Patent Number: 4,954,146
[45] Date of Patent: Sep. 4, 1990

[54] SEPARATION OF GASEOUS MIXTURES

[75] Inventors: Michael E. Garrett, Woking, United Kingdom; William R. Weltmer, Jr., Murray Hill, N.J.

[73] Assignee: The BOC Group plc, Windlesham, England

[21] Appl. No.: 340,964

[22] Filed: Apr. 20, 1989

[30] Foreign Application Priority Data

May 24, 1988 [GB] United Kingdom ............... 8812263

[51] Int. Cl.$^5$ ............................................. B01D 53/04
[52] U.S. Cl. ........................................... 55/25; 55/28; 55/58; 55/179; 55/208; 55/269
[58] Field of Search ............... 55/25, 26, 28, 33, 58, 55/75, 161–163, 179, 208, 269, 389

[56] References Cited

U.S. PATENT DOCUMENTS

| 2,580,404 | 1/1952 | Bush | 55/33 |
|---|---|---|---|
| 3,103,425 | 9/1963 | Meyer | 55/179 X |
| 3,206,918 | 9/1965 | Robinson | 55/179 |
| 3,323,288 | 6/1967 | Cheung et al. | 55/179 X |
| 3,734,293 | 5/1973 | Biskis | 55/179 X |
| 3,850,592 | 11/1974 | Huffman | 55/179 X |
| 4,165,972 | 8/1979 | Iles et al. | 55/162 X |
| 4,444,727 | 4/1984 | Yanagihara et al. | 55/208 X |
| 4,527,398 | 7/1985 | Schaetzle | 55/208 X |
| 4,696,681 | 9/1987 | Lloyd-Williams | 55/28 |
| 4,698,073 | 10/1987 | Rohde et al. | 55/179 X |
| 4,738,694 | 4/1988 | Godino et al. | 55/179 X |
| 4,786,301 | 11/1988 | Rhodes | 55/208 X |
| 4,793,143 | 12/1988 | Rhodes | 55/28 X |

FOREIGN PATENT DOCUMENTS

| 1144873 | 4/1983 | Canada | 55/208 |
|---|---|---|---|
| 1240821 | 5/1967 | Fed. Rep. of Germany | 55/163 |
| 55-092122 | 7/1980 | Japan | 55/179 |
| 82-041968 | 9/1982 | Japan | 55/208 |
| 60-239303 | 11/1985 | Japan | 55/208 |
| 0801859 | 2/1981 | U.S.S.R. | 55/161 |
| 2073043A | 10/1981 | United Kingdom . | |
| 2163670A | 3/1986 | United Kingdom . | |
| 2163669A | 5/1986 | United Kingdom . | |

Primary Examiner—Robert Spitzer
Attorney, Agent, or Firm—Carol A. Nemetz; David M. Rosenblum; Robert I. Pearlman

[57] ABSTRACT

A method and apparatus is disclosed in the separation of a gaseous mixture by pressure swing adsorption utilizing two beds of adsorptive material which are operated out of phase in the cycle thereby providing a more-or-less continuous flow of product. Each adsorbent bed contains a heat exchange chamber holding a volatile liquid. The liquid gives up vapor in the bed undergoing adsorption and condenses in the bed undergoing desorption. Heat is thereby transferred between the beds, thus improving the efficiency of each stage by retaining heat which would otherwise be lost.

11 Claims, 2 Drawing Sheets

SEPARATION OF GASEOUS MIXTURES

This invention relates to the separation of gaseous mixtures, particularly by pressure swing adsorption.

BACKGROUND OF THE INVENTION

Pressure swing adsorption is a well known method of separating the components of a gaseous mixture by passage through a bed of adsorbent that preferentially adsorbs at least one component. A gaseous product that is relatively lean in the adsorbed component(s) passes out of the bed. The bed is regenerated by subjecting it to a lower pressure thereby desorbing the previously adsorbed component(s). The adsorbent is generally a molecular sieve, e.g. a zeolite or carbon molecular sieve. In more efficient commercial PSA processes, a plurality of beds is employed and the incoming gas stream for separation is switched between the beds so as to facilitate the continuous supply of gaseous products. Pressure swing adsorption processes are for example described in our UK patent applications 2073043A and 2163669A, and an improved apparatus for separation of gaseous mixture by pressure swing adsorption is described in our UK patent application 2163670A.

The equilibrium quantity of a gas adsorbed on a molecular sieve is not solely a function of pressure but also one of temperature. Indeed, some commercial gas separation processes effect separation by temperature swing rather than pressure swing. Although typical zeolite molecular sieves have gaseous adsorption equilibrium values that are achieved rapidly and then remain constant with time, carbon molecular sieves exhibit dynamic sieving behavior before coming to equilibrium (the former effects the separation), both kinds of sieve increase in temperature as gas is adsorbed since heat of adsorption is liberated, and decrease in temperature again when gas is desorbed. These changes in temperature are substantially equal. There is, however, an additional increase in temperature as a result of the compression of the incoming gas mixture for separation. A substantial proportion of the heat of compression is removed in an after cooler that is conventionally associated with the compressor. There is also a reduction in temperature associated with the reduction in pressure during the desorption step. It might be expected that the PSA process would therefore run at an average temperature below ambient in view of there being net refrigeration that is produced by the pressure reduction required to effect the desorption step. In practice, however, only a relatively small proportion of the refrigeration developed during the desorption step is employed to reduce the temperature of the bed of adsorbent, and most of the refrigeration generated during desorption is wasted in the gas that is vented to the atmosphere. Thus, in practice, the average temperature at which the pressure swing adsorption process operates is usually above rather than below ambient temperature. Since the equilibrium amount of gas that is adsorbed increases with decreasing temperature, the failure to efficiently use the refrigeration generated leads to unnecessarily high specific power consumption. Moreover, the temperature rise that takes place during adsorption is also undesirable since lower temperatures generally favor adsorption. The temperature fall that takes place during desorption is similarly undesirable since in general higher temperatures favor desorption.

There is thus a need to create a more favorable thermal regime during a pressure swing adsorption process and it is an aim of the present invention to provide a method and apparatus for meeting this need.

SUMMARY OF THE INVENTION

According to the present invention there is provided a method of separating a gaseous mixture by pressure swing adsorption utilizing at least two beds of adsorbent material capable of adsorbing at least one component thereof:
 (a) admitting the mixture to a bed of adsorbent material under pressure, thereby adsorbing said at least one component and discharging a gas relatively lean with regard thereto, and
 (b) desorbing said adsorbed at least one component from said bed by subjecting the bed to a pressure lower than that at which adsorption is performed and discharging said at least one component,
wherein said method is carried out in a cyclic manner with the beds out of phase such that, in each cycle, a portion of the time in which each of said beds is undergoing adsorption, another is undergoing desorption, the method further including transferring heat generated in said bed undergoing adsorption by causing vapor to be evolved from a volatile liquid contained in a heat exchange chamber within said adsorbing bed and causing said vapor to be condensed in a heat exchange chamber in said desorbing bed, the upper and lower portions, respectively, of said chambers being in fluid flow communication, such that there is a net flow of vapor from the chamber in the adsorbing bed to the chamber in the desorbing bed and a net flow of liquid from the chamber in the desorbing bed to the chamber in the adsorbing bed.

The invention also provides apparatus for separating a gaseous mixture by pressure swing adsorption, comprising first and second vessels each containing a bed of molecular sieve, first and second heat exchange chambers each holding a volume of volatile liquid located within said beds, a conduit connecting a lower portion of said chambers to permit the flow of volatile liquid therebetween in operation of the apparatus, a second conduit placing the ullage space of the one chamber in communication with the ullage space of the other chamber to permit the flow of vapor therebetween, and means for controlling the pressure in the ullage spaces of said chambers.

The drawings are not to scale.

DETAILED DESCRIPTION OF THE INVENTION

Figure 1:
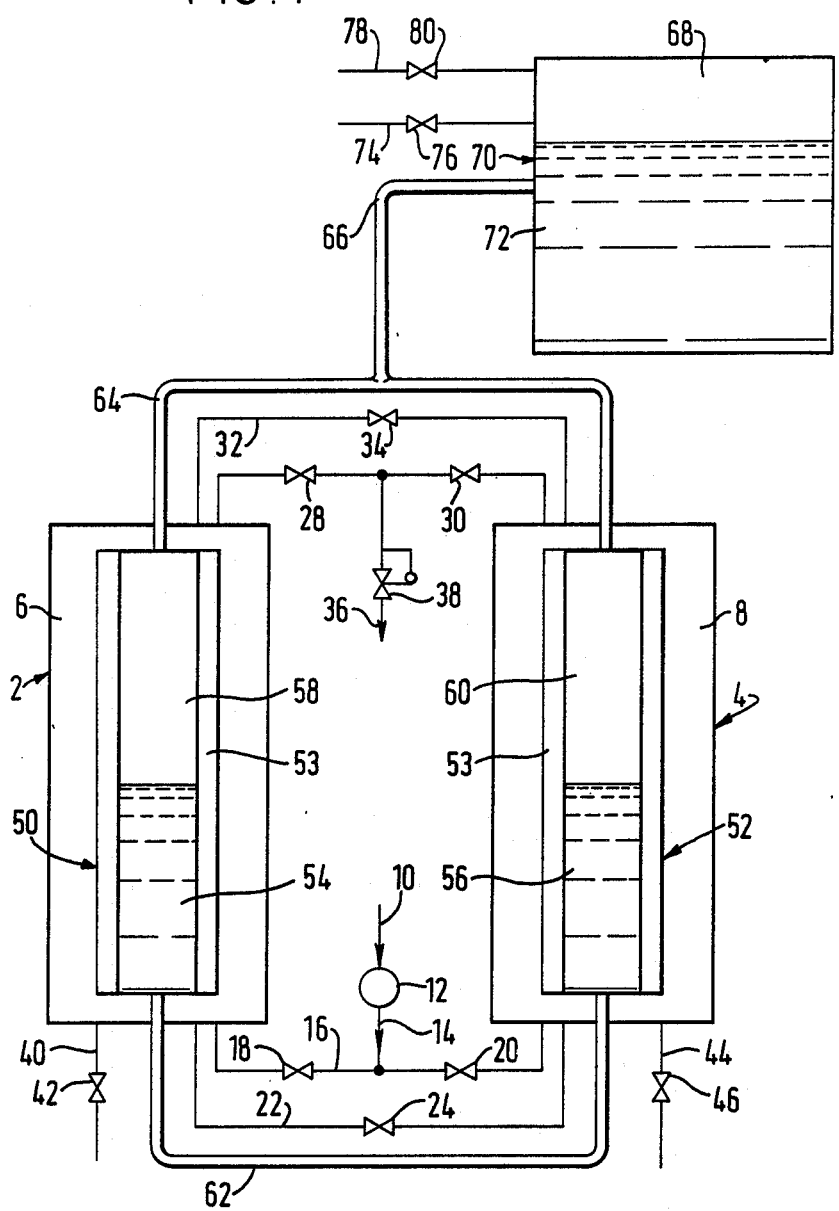
FIG. 1 is a schematic diagram of one apparatus for separating nitrogen from air by pressure swing adsorption.

Referring to FIG. 1, the illustrated plant comprises a first cylindrical vessel 2 containing a bed 6 of molecular sieve adsorbent and a substantially identical vessel 4 containing a bed 8 of the same adsorbent. The beds 6 and 8 are of equal height and are at the same level. The apparatus is provided with an inlet 10 for incoming gaseous mixture for separation which communicates with a compressor 12 having an outlet 14 terminating in a pipeline 16 which connects the bottoms of the two vessels 2 and 4. The pipeline 16 has disposed therein a first on-off valve 18 which is operatively associated with the vessel 2. The pipeline 16 has disposed therein a second on-off valve 20 which is operatively associated with the vessel 4.

There is also a pressure equalization pipeline 22 extending from the bottom of the vessel 2 to the bottom of the vessel 4. An on-off valve 24 is located in the pipeline 22.

A pipeline 26 extends from the top of the vessel 2 to the top of the vessel 4. On-off valves 28 and 30 are disposed in a portion of the pipeline 26 adjacent the tops of the vessel 2 and 4, respectively. A further pipeline 32 extends from the top of the vessel 2 to the top of the vessel 4. An on-off valve 34 is disposed in the pipeline 32. An outlet 36 communicates with a region of the pipeline 26 intermediate with the valves 28 and 30. The outlet 36 has a pressure regulator 38 located therein and may if desired communicate directly with a plant for using the gas produced in operation of the apparatus shown in the drawing or may communicate with such a plant via a buffer vessel (not shown) which is operable to even out cyclical changes in the pressure, flow rate and composition of the product gas in a manner well known in the art.

At the bottom of the vessel 2 there is situated a vent pipe 40 having disposed therein an on-off valve 42. A similar vent pipe 44 having an on-off valve 46 disposed therein communicates with the bottom of the vessel 4. Typically, the vent valves 42 and 46 vent gas directly to the atmosphere and thus the beds 6 and 8 are never operated at below ambient pressure. It is however alternatively possible to operate the plant by completing the desorption step at a sub-atmospheric pressure, in which case the vent pipes 40 and 44 each communicate with the inlet of a vacuum pump (not shown). If such a vacuum pump is employed, it is possible to arrange for the incoming gas to enter the beds, 6 and 8 at a pressure on the order of 1 atmosphere absolute, thus eliminating the compressor 12. In the subsequent description, however, it should be understood that the incoming gas is compressed in the compressor 12 to a pressure above atmospheric pressure, typically between about 4 to 10 atmospheres absolute and that desorption is effected by placing each bed in turn in communication with the atmosphere.

Immersed in the bed 6 is a first heat exchange chamber 50. An identical chamber 52 is immersed in the bed 8. The chambers 50 and 52 are located in corresponding axial positions in beds 6 and 8, respectively The chambers contain volumes 54 and 56, respectively, of a volatile liquid such as a Freon (Freon is a registered trademark). In the chamber 50 there is an ullage space 58 and a similar ullage space 60 is provided in the chamber 52. The bottoms of the chambers 50 and 52 communicate via a conduit 62 and the tops via a conduit 64. An intermediate location of the conduit 64 receives another conduit 66 communicating with the ullage space 68 of a closed reservoir 70 containing a volume 72 of the volatile liquid. A liquid reservoir 70 has a fill line 74 with an on-off valve 76 disposed therein and a vent line 78 communicating with its ullage space 68, the vent line 78 having a vent valve 80 disposed therein.

Means (not shown) may be provided for sensing the pressure in the ullage space 70 so as to control operation of the valves 76 and 80 to maintain a substantially constant pressure in the ullage space 68. For example, should the pressure fall below a chosen value, the fill line 74 may be opened so as to admit more volatile liquid into the reservoir 70, and thereby restore the desired pressure, whereas if the pressure rises above the desired pressure in the ullage space 68, the vent valve 80 may be opened to lower the pressure to the desired value again.

The chambers 50 and 52 are multiple and are preferably provided by heat exchange tubes of a conventional kind having heat exchange fins 53 to assist heat transfer with its surrounds. The chambers and fins may be formed of aluminium or copper or other metal having high thermal conductivity. It is not necessary for the tubes to contain a large volume of working fluid, although, it is preferred that each of the chambers 50 and 52 has a volume say 10 times in excess of the volume of the conduit 62. Similarly, it is preferred that the reservoir 70 has a volume at least 10 times in excess of the combined volumes of the chambers 50 and 52. The liquid employed in the reservoir 70 and in the chambers 50 and 52, and the pressure in the ullage space 68 of reservoir 70 is chosen such that the liquid in the chambers 50 and 52 will boil at a chosen temperature. Throughout the steady-state operation of the apparatus, the pressure in the ullage space 68 is maintained so as to prevent any substantial deviation in the temperature at which the liquid boils in the chambers 50 and 52. It is desirable to choose a volatile liquid whose saturation pressure at the desired operating temperature is no more than a few atmospheres so as to avoid the need to manufacture the chambers 50 and 52 and reservoir 70 and associated pipes and valves such that they have to withstand particularly large pressures.

In operation, the apparatus shown in the drawing may be used to separate nitrogen from air. In a typical and known cycle, the incoming air is compressed to a chosen pressure in the compressor 12 and with only valves 18, 28 and 46 of the on-off valves open, is admitted to the vessel 2. Carbon molecular sieve is employed to adsorb carbon dioxide and oxygen in preference to nitrogen. (Typically, particulates and water vapor may be removed from the incoming gas by means (not shown) intermediate the compressor 12 and the pipeline 16.) When the pressure in the bed 6 has reached a value determined by the setting of the regulator 38 a nitrogen-rich gas, typically containing at least 95% volume of nitrogen, passes out of the vessel 2 through the outlet 36 as product. Typically, this step of the cycle may take one to six minutes. While the incoming air is passing into bed 6, bed 8 is being regenerated by placing the vessel 4 in communication with the atmosphere through the outlet 44. As a result, gas in the void spaces of the bed is caused to flow out through the bottom of the vessel 4 and, as the pressure falls in bed 8, so gas will be desorbed from the molecular sieve adsorbent and will accordingly also flow out of the bed 8 through the outlet 44. The duration of this desorption step is equal to the duration of the adsorption step being performed on the bed 6. In operation, this duration may be selected so as to give a product gas of chosen purity at a given flow rate. When the said adsorption step has run its course, valves 18, 28 and 46 are closed and valves 24 and 34 opened. Unadsorbed gas thus flows from the bed 6 into the bed 8 and the pressure between the two beds is substantially equalized. After a few seconds, typically up to about 5 seconds, valves 24 and 34 are closed again and valves 20, 30 and 42 opened. Now the roles of beds 6 and 8 are reversed from what they were at the start of the cycle. Bed 8 is used to adsorb the oxygen and carbon dioxide from the incoming air and supply a nitrogen product to the outlet 36. At the same time, the bed 6 is regenerated by the flow of gas therefrom through the outlet 40 at the bottom of the vessel 2, this gas being vented to the atmosphere. The duration of these adsorption and desorption steps equals the first adsorption step in the cycle. At the end of the adsorption step performed by bed 8 and the desorption step performed by bed 6, valves 20, 30 and 42 are closed and valves 24 and 34 opened to allow the pressure between the two beds to be equalized with unadsorbed gas flowing from the bed 8 to the bed 6. The duration of this pressure equalization step is the same as the first pressure equalization step. At the end of the second pressure equalization step, valves 24 and 34 are closed and valves 18, 28 and 46 reopened and thus the apparatus is in a position to repeat the cycle.

Suppose now that in steady-state operation of the apparatus shown in FIG. 1, the temperatures in the beds 6 and 8 are equal to the temperature at which the volatile liquid in the chambers 50 and 52 boils, this temperature being Predetermined by the pressure that is maintained in the ullage space 68 of the reservoir 70. The volumes of liquid 54, 56 and 72 in the chambers 50 and 52 and the reservoir 70, respectively, are in equilibrium with the vapor in the ullage spaces 58, 60 and 68. Suppose now that the bed 6 is adsorbing gas from the incoming gaseous mixture and the bed 8 is desorbing previously adsorbed gas. During adsorption in bed 6 heat is generated. Heat is thus conducted through the walls of the chamber 50 to the liquid 54 therein and causes some of this liquid to boil at the chosen temperature. There is thus a net flow of vapor into the ullage space 58 which will condense because this is at the initial temperature. Simultaneously, heat is extracted from the chamber 52 by the gas desorbing from the bed 8. This extraction of heat causes vapor in the ullage space 60 to condense at the chosen temperature. There will thus be a net flow of liquid from the chamber 52 to the chamber 50. The amount of vapor that is condensed will be equal to the amount of liquid boiled so that there is no change in the vapor pressure. In practice, however, since the expansion of the gas that takes place in the bed 8 is not matched by compression of the gas in the bed 6 (compression having been performed in the compressor 12 which is operated with an after-cooler (not shown) such that at least some of the heat of compression is removed), some additional cooling will be provided in the bed 8 which is not balanced by heating in the bed 6. Thus there will tend to be more vapor condensed in the chamber 52 than liquid boiled in the chamber 50. However, in practice this difference is relatively small and is easily catered for by the buffering effect of the reservoir 70.

An increase in the pressure in the ullage spaces of the chambers 50 and 52 causes an increase in the pressure in the ullage space 68 of the chamber 70. The vent valve 80 automatically opens to release the excess pressure, and closes again when the pressure in the ullage space 68 has returned to the chosen pressure Since there is free, unrestricted, communication between ullage spaces of the chambers 50 and 52 and the ullage space 68 of the reservoir 70, the pressure in the ullage spaces 58 and 60 is restored to the chosen pressure and hence the liquid in the chamber for the time being in heat exchange relationship with the bed in the adsorption mode continues to boil at a chosen temperature. Moreover, since each adsorption step typically lasts no more than six minutes, the tendency for the rate of condensation of vapor to exceed the rate of boiling liquid is not a continuing one, but one that is reversed from the first part to the second part of each pressure swing adsorption cycle.

It will therefore be appreciated that in effect heat is transferred from the bed in the adsorption mode to the bed in the desorption mode and that the chambers 50 and 52 are thus effective to limit the changes in temperature that take place within the bed during the PSA cycle. Moreover, since there is a tendency for the cycle to produce net refrigeration, the apparatus may be operated at a temperature a little bit below ambient temperature.

By appropriately adjusting the pressure in the ullage space of the reservoir, the temperature at which the volatile liquid boils may be readily selected so as to enable condensation in the chamber in heat exchange relationship with the bed currently in the desorption mode to take place simultaneously with boiling in the other chamber. Thus, refrigeration generated in the chamber currently in the desorption mode condenses the volatile liquid thereby lessening any temperature reduction that takes place during desorption, while heat evolved during the adsorption step is employed to boil the volatile liquid thereby reducing any temperature rise taking place as a result of the release of the heat of adsorption. Since the heat of adsorption is approximately balanced by the loss heat during desorption, the tendency for there to be an increase in pressure and hence a change in the boiling point of the volatile liquid as a result of the boiling of the liquid in one chamber is balanced by the tendency for there to be a reduction in vapor pressure as a result of the condensation of vapor in the other chamber. Since, as mentioned above, the pressure swing adsorption cycle generates net refrigeration, there is a tendency for more vapor to be condensed in the chamber in heat exchange relationship with the bed in the desorption mode than there is for liquid to be boiled in the other chamber. It is however not essential to the invention that during each pressure swing adsorption cycle the amount of liquid boiled in one chamber is equal to the amount of vapor condensed in the other, and this tendency will not result in one chamber gradually being depleted of liquid or in the other gradually filling with liquid, as in pressure swing adsorption as the beds are a at predetermined time intervals switched from adsorption mode to desorption mode and vice versa. Moreover, the reservoir has the effect of dampening any changes in pressure that tend to take place in the chambers and thus helps to keep to manageable proportions any disparity between the rate of condensing vapor in one chamber and the rate of boiling liquid in the other chamber.

At start-up of the apparatus, the pressure in the ullage space 68 of the reservoir 70 may be set to the chosen pressure at which it is desired that the liquid in the chambers 50 and 52 should boil. Typically this temperature may be below ambient temperature. Initially, the gas entering the bed 6 may be at a temperature above ambient temperature. Thus, when it comes to operate bed 6 in the desorption mode, the temperature therein may still be above the boiling point of the liquid in the chamber 50, and similarly with the liquid in the chamber 52. Since, however, in each cycle of operations net refrigeration is provided, the average temperature of the beds will gradually fall until stable operating conditions are achieved. If necessary, vapor may be vented from the ullage space 68 of the reservoir 70 so as to maintain the pressure in the ullage spaces 58 and 60 of the chambers 50 and 52 substantially constant during the start-up period. Stable operating conditions will be achieved at a temperature in which the net refrigeration produced in the beds 6 and 8 balance the net heat inleak.

In operation of the system shown in FIG. 1, the ability to set the temperature at which the liquid boils and hence the average operating temperature of the beds significantly below ambient temperature may be limited. A lower bed operating temperature that can otherwise be achieved may, however, be realized by transferring heat frOm the incoming gas mixture for separation to the desorbed gas mixture that is discharged from the bed in the desorption mode. Although such transfer of heat may be effected by direct heat exchange between the two gases, it is preferably effected by means of an intermediate volatile liquid. In a preferred arrangement, there are third and fourth heat exchange chambers, both containing a volatile liquid, the third chamber being in heat exchange relationship with the incoming gas stream for separation and the fourth chamber being in heat exchange relationship with the desorbed gas stream, there being a third conduit placing the ullage spaces of said chambers in communication with one another and a fourth conduit placing the lower portions of said third and fourth chambers in communication with one another. The volatile liquid employed in the third and fourth chambers may be the same as that in the first and second chambers, and the pressure in the third and fourth chambers may be controlled at a lower value than that in the first and second chambers, or, alternatively, different volatile liquids may be employed in the third and fourth chambers. It can thus be arranged for the liquid in the third and fourth chambers to have a different boiling point from the liquid in the first and second chambers and thus for the temperature or the incoming gas to be reduced substantially to this boiling Point upstream of where it is adsorbed. Such a system is shown in FIG. 2.

Figure 2:
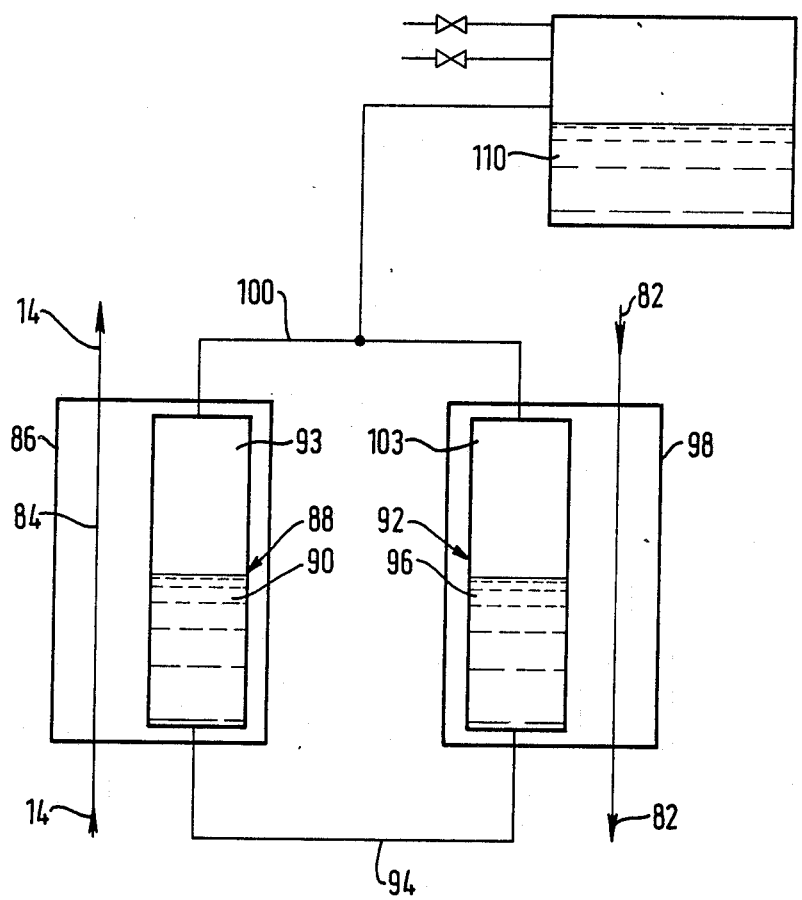
FIG. 2 is a schematic diagram of a heat exchange means that is for use in conjunction with the apparatus shown in FIG. 1.

In FIG. 2 there is shown an addition to the apparatus in FIG. 1 whereby a lower yet stable operating temperature can be achieved. The inlet pipe 14 shown in FIG. 1 is placed in heat exchange relationship with a common outlet pipe 82 communicating with the outlets 40 and 44 (not shown in FIG. 2). It is thus possible to recover refrigeration from the gas that is vented to the atmosphere so that more of the refrigeration generated in the pressure swing adsorption is thereby utilized rather than being wasted. Referring again to FIG. 2, the pipe 14 includes a first pass 84 of a heat exchanger 86. A second pass of the heat exchanger 86 is constituted by a third heat exchange chamber 88. The chamber 88 contains a volume 90 of volatile liquid. The bottom of the chamber 88 communicates via a conduit 94 with the bottom of a similar chamber 92 forming a pass of a second heat exchanger 98. The chamber 92 contains a volume 96 of volatile liquid. A conduit 100 places the ullage space 93 at the top of the chamber 88 in communication with a similar ullage space 103 at the top of chamber 92. Another pass of the heat exchanger 98 forms part of the aforesaid common outlet 82. An intermediate location of the conduit 100 communicates with the ullage space of a closed reservoir 110 containing the same volatile liquid as the chambers 88 and 92. The construction and operation of the reservoir 110 shown in FIG. 2 is substantially the same as that of the reservoir 70 shown in FIG. 1 and therefore no further description of the reservoir 110 will be made.

In operation, in a manner entirely analogous to the operation of the chambers 50 and 52 shown in FIG. 1, the volatile liquid is effective to transfer heat from the incoming air for separation to the outgoing vented gas and thereby reduces the temperature of the incoming air before it enters the adsorbent vessels. Accordingly, a lower average working temperature in the beds 6 and 8 of the apparatus shown in FIG. 1 is made possible. As aforementioned, the volatile liquid employed in the chambers 88 and 92 may be the same as or different from that employed by chambers 50 and 52, but if it is the same, a lower working pressure will typically be employed.

If desired, the apparatus shown in FIG. 2 may be employed as a simple control mechanism containing plant purity under other varying conditions.

In the apparatuses shown in FIGS. 1 and 2, each chamber containing working fluid may with advantage be replaced by an array of relatively thin chambers.

We claim:

1. A method of separating a gaseous mixture by pressure swing adsorption utilizing at least two beds of adsorbent material capable of adsorbing at least one component of said mixture comprising:
   (a) admitting the mixture to a bed of adsorbent material under pressure, thereby adsorbing said component and discharging a gas relatively lean with regard thereto, and
   (b) desorbing said adsorbed component from said bed by subjecting the bed to a pressure lower than that at which adsorption is performed and discharging said component, wherein said method is carried out in a cyclic manner with the beds out of phase such that, in each cycle, a portion of the time in which each of said beds is undergoing adsorption, another is undergoing desorption, the method further including transferring heat generated in said bed undergoing adsorption by causing vapor to be evolved from a volatile liquid contained in a heat exchange chamber within said adsorbing bed and causing said vapor to be condensed in a heat exchange chamber in said desorbing bed, the upper and lower portions, respectively, of said heat exchange chambers being in fluid flow communication, such that there is a net flow of vapor from the chamber in the adsorbing bed to the chamber in the desorbing bed and a net flow of liquid from the chamber in the desorbing bed to the chamber in the adsorbing bed.

2. A method in accordance with claim 1, wherein the ullage spaces of said chambers communicate with the ullage space of a reservoir containing a volume of said liquid, and additionally including the step of controlling the pressure in the ullage space of said reservoir.

3. A method in accordance with claim 1, additionally including the step of transferring heat from the incoming gas mixture for separation to said desorbed component that is discharged from the bed.

4. A method in accordance with claim 3, wherein said heat is transferred by use of an arrangement comprising third and fourth heat exchange chambers, both containing a volatile liquid, the third heat exchange chamber being in heat exchange relationship with the incoming gas mixture for separation and the fourth heat exchange chamber being in heat exchange relationship with a stream of said desorbed component, a third conduit placing the ullage spaces of said chambers in heat exchange relationship and a fourth conduit placing the lower portions of said third and fourth chambers in communication, liquid being boiled in said third chamber and vapor being condensed in said fourth chamber.

5. A method in accordance with claim 4, additionally including the step of controlling the pressure in the ullage spaces of said third and fourth chambers.

6. A method in accordance with claim 5, wherein the volatile liquid held in said third and fourth chambers is the same liquid as that which is held in said first and second chambers, and the pressure in the ullage spaces of said third and fourth chambers is held at a lower value than that at which the pressure in said first and second chambers is held.

7. A method in accordance with claim 4, wherein the volatile liquid held in said third and fourth chambers has a different composition from the volatile liquid that is held in the first and second chambers.

8. Apparatus for separating a gaseous mixture by pressure swing adsorption, comprising a first vessel containing a first bed of molecular sieve and a second vessel containing a second bed of molecular sieve, a first heat exchange chamber which holds a volume of volatile liquid, and which is located within said first bed, a second heat exchange chamber which holds a volume of said volatile liquid and which is located in said second bed, a conduit connecting a lower portion of said first chamber with a lower portion of said second chamber to permit the flow of volatile liquid therebetween in operation of the apparatus, a second conduit placing the ullage space of one chamber in communication with the ullage space of the other chamber to permit the flow of vapor therebetween, and means for controlling the pressure in the ullage spaces of said chambers.

9. Apparatus in accordance with claim 8, wherein the ullage spaces of the chambers communicate with the ullage space of a reservoir containing a volume of said volatile liquid, and additionally including means for controlling the pressure in the ullage space of said reservoir.

10. Apparatus in accordance with 9, wherein additionally including means for transferring heat from incoming gas mixture for separation to a desorbed component or components of such mixture.

11. Apparatus in accordance with claim 10, wherein said means for transferring heat comprises a third heat exchange chamber, a fourth heat exchange chamber, both containing a volatile liquid, the third heat exchange chamber being able to be placed in heat exchange relationship with the incoming gas mixture for separation and the fourth heat exchange chamber being able to be placed in heat exchange relationship with a stream of said desorbed component or components, a third conduit placing the ullage spaces of said third and fourth chambers in heat exchange relationship with one another, and a fourth conduit placing the lower portions of said third and fourth chambers in communication.

* * * * *